United States Patent [19]

Prigent et al.

[11] Patent Number: 4,985,387

[45] Date of Patent: Jan. 15, 1991

[54] CATALYST SUPPORTS/CATALYSTS FOR THE TREATMENT OF VEHICULAR EXHAUST GASES

[75] Inventors: Michel Prigent, Rueil Malmaison; Gilbert Blanchard, Le Plessis Belleville; Francois Garreau, Paris; Philippe Courty, Houilles, all of France

[73] Assignee: Pro-Catalyse, Rueil Malmaisc Cedex, France

[21] Appl. No.: 324,456

[22] Filed: Mar. 16, 1989

[30] Foreign Application Priority Data

Mar. 16, 1988 [FR] France ................................ 88 03385

[51] Int. Cl.$^5$ .......................... B01J 21/04; B01J 23/10; B01J 23/40
[52] U.S. Cl. .................................... 502/304; 502/302; 502/303; 502/524; 423/213.5
[58] Field of Search ............... 502/303, 304, 524, 302; 423/213.5

[56] References Cited

U.S. PATENT DOCUMENTS

| 4,239,656 | 12/1980 | Fujitani et al. | ................. 502/304 X |
| 4,274,981 | 6/1981 | Suzuki et al. | ................... 502/304 X |
| 4,316,822 | 2/1982 | Fujitani et al. | .................. 423/213.5 |

Primary Examiner—W. J. Shine
Attorney, Agent, or Firm—Burns, Doane, Swecker & Mathis

[57] ABSTRACT

Thermally stable, sulfur-resistant catalysts for the conversion of exhaust gases from internal combustion engines includes an inert, rigid support substrate, e.g., a cellular monolith, coated with a layer of porouse material, the porous material containing alumina, at least one rare earth oxide, and a spinel type compound having a specific surface of at least 50 $m^2/g$, and the support substrate having an effective amount of a catalytically active phase impregnated onto the porous coating thereof.

25 Claims, No Drawings

CATALYST SUPPORTS/CATALYSTS FOR THE TREATMENT OF VEHICULAR EXHAUST GASES

BACKGROUND OF THE INVENTION

1. Field of the Invention

The present invention relates to a novel catalyst for the treatment of exhaust gases from internal combustion engines, and to a process for the production thereof.

This invention especially relates to a catalyst support of the monolithic type, the inert and rigid substrate of which is coated with a layer of a porous material, as well as to the catalyst produced by impregnation of such support with catalytically active elements.

2. Description of the Prior Art

In the catalytic treatment of vehicular exhaust gases emanating from internal combustion engines, the catalytic converters are typically charged with monolithic catalysts. These catalysts comprise a rigid and inert support upon which a layer of a porous material, such as for example alumina, is deposited, said layer in turn being impregnated with a catalytically active phase. A process for the preparation of such a catalyst and, in particular, of a monolithic support coated with a porous material is described in EP No. 73,703. This process makes it possible to deposit a layer of a porous material, e.g., alumina, onto a monolithic metallic or refractory ceramic substrate.

This process also provides for the partial replacement of alumina with other metallic oxides.

It is also known to this art that the rare earth oxides and, in particular, cerium oxide, when added to the alumina constituting the porous coating, improve the thermal stability and efficiency of the catalyst. These effects are of significant importance in the treatment of the exhaust gases from internal combustion engines, during which the catalysts are heated to elevated temperatures.

Monolithic catalyst supports, the porous coating of which is a metallic aluminate having a spinel structure, such as a magnesium aluminate, have also been proposed to this art. However, these coatings, which have adequate thermal stability, display the major disadvantage of possessing a very low specific surface. Thus, only a small amount of catalytically active elements can be deposited onto the coated supports, and this appreciably reduces the life of the catalyst.

The catalysts heretofore known to this art have the disadvantage of being highly sensitive to the presence of sulfur or sulfur compounds in the exhaust gas. In fact, sulfur serves as a poison and effectively reduces the useful life of such catalysts.

SUMMARY OF THE INVENTION

Accordingly, a major object of the present invention is the provision of improved catalyst supports/catalysts for the treatment of exhaust gases from internal combustion engines, which improved catalyst supports/catalysts have good thermal stability, will tolerate the presence of sulfur or sulfur compounds in the exhaust gases, and otherwise avoid the above disadvantages and drawbacks to date characterizing the state of this art.

By the expression "tolerate the presence of sulfur" is intended to connote that the duration of the life of the catalyst is not adversely affected, or is but slightly adversely affected by this element.

Briefly, the present invention features a catalyst support, notably for catalysts for treating the exhaust gases from internal combustion engines, of the type comprising a substrate coated with a porous layer upon which a catalytically active phase is impregnated, and wherein such porous layer comprises alumina, at least one rare earth oxide and a spinel type compound having a specific surface equal to at least 50 m²/g.

DETAILED DESCRIPTION OF THE PREFERRED EMBODIMENTS OF THE INVENTION

More particularly according to the present invention, by "spinel type compounds" are intended the mixed metallic oxides of the following general formula:

$M^1M^2{}_2O_4$ wherein $M^1$ is a divalent metallic element selected from among Zn, Ni, Mg and Co; and $M^2$ is aluminum.

In a preferred embodiment of the invention, the divalent metallic element $M^1$ is nickel or cobalt.

Spinels suitable for the invention are those having a specific surface greater than 50 m²/g, advantageously ranging from 50 m²/g to 300 m²/g.

Exemplary thereof, spinels based on magnesium, zinc and nickel are representative.

These spinels may be prepared, for example, by the impregnation of an alumina having a high specific surface by a solution of a divalent metal salt. The impregnated material is then dried and calcined at a temperature of less than 1,000° C. The product obtained is ground to produce a particle size suitable for the coating of the substrate.

In another preferred embodiment of the invention, the composition by weight of the porous layer is as follows:

| | |
|---|---|
| Alumina | 15% to 40% |
| Rare earth oxides | 1% to 25% |
| Spinel type compound | 35% to 84% |

The preferred composition is

| | |
|---|---|
| Activated alumina | 20% to 40% |
| Rare earth oxides | 5% to 20% |
| Spinel type compound | 40% to 75% |

All of the concentrations are expressed as dry weight percentages after calcination at 1,000° C. for 4 hours, unless otherwise indicated.

The rare earth oxides suitable for the present invention are oxides of metallic elements selected from among the lanthanides, with cerium oxide being the preferred oxide.

The suitable aluminas are those customarily used in catalysis, in particular as supports, and, for example, the alumina prepared by the dehydration of a hydrated alumina, such as hydrargillite, in a flowstream of hot gases.

It is also possible to use an alumina prepared in the form of a gel, for example by carbon precipitation.

This invention also features a catalyst for the treatment of exhaust gases from internal combustion engines, comprising the aforedescribed catalyst support having a catalytically active phase impregnated onto the porous layer of the substrate.

The catalysts used for the treatment of exhaust gases from internal combustion engines are classified in two categories, according to their activity.

A first category is designated "oxidation" catalysts; such catalysts catalyze the oxidation of unburned hydrocarbons and of the carbon monoxide contained in the exhaust gases. The second category is designated "multifunctional" catalysts; these effect elimination of the three principal types of polluting compounds contained in the exhaust gas, i.e., unburned hydrocarbons, nitrogen oxides and carbon monoxide.

Multifunctional catalysts typically contain, as components of the catalytically active phase, one or more precious metals, optionally combined with one or more other metals, such as, for example, nickel, iron, zirconium, vanadium, chromium, cerium, tungsten, manganese, tin, germanium, cobalt, uranium, rhenium or a rare earth.

Compare, for example, EP No. 27,069 which describes a catalyst comprising a support based on a refractory oxide and a catalytically active phase including cerium, iron and at least one metal selected from among iridium and rhodium, and a metal selected from among platinum and palladium.

European Patent EP No. 54,472 describes a multifunctional catalyst comprising an inert honeycomb substrate coated with a layer or film of a refractory oxide, the active phase of which includes copper, cerium or iron, at least one metal selected from among platinum and palladium, and at least one metal selected from among iridium and rhodium.

The active phase is deposited or impregnated in a uniform manner onto the surface of the monolithic support utilizing a solution of precursors of the elements of the active phase.

Oxidation catalysts generally comprise one or more metals of the platinum type, such as platinum and palladium and, optionally, one or more additional metals, such as nickel, iron, zirconium, vanadium, chromium, cerium, tungsten, manganese, tin, germanium, cobalt, uranium, rhenium, and the rare earths.

Exemplary are those catalysts described in European Patents EP Nos. 100,267 and 145,584, assigned to the assignee hereof.

Other examples of multifunctional or oxidation catalysts are provided in European Patents EP Nos. 60,740, 126,676 and 170,588, also assigned to the assignee hereof.

Substrates suitable for the invention are advantageously refractory substrates, such as, for example, metal or ceramic substrates.

Ceramic substrates are, for example, those containing as their principal material cordierite, alumina, mullite, porcelain, boron or silicon carbides.

Suitable metal substrates are, in particular, those produced from alloys of iron, nickel and chromium and those produced from alloys of iron, chromium, aluminum and cobalt, such as those marketed under the trademark of KANTHAL, or those produced from alloys of iron, chromium, aluminum and yttrium, marketed under the trademark FECRALLOY. The metal may also be a carbon steel, or a simple cast iron.

The metallic substrates based on aluminum may advantageously be pretreated by heating them in an oxidizing atmosphere under conditions of duration and temperature enabling formation, from the aluminum contained in the alloy, of an aluminum oxide surface layer. In the case of carbon steels or cast iron it is also possible to pretreat them by annealing the iron or the steel covered with aluminum, to provide an aluminum-/iron diffusion coating.

In a preferred embodiment of the invention, the structure of the rigid substrate is advantageously a cellular honeycomb structure, which may be hexagonal, triangular, tetragonal, or corrugated, and it must permit the passage of gas in the channels or conduits formed during production thereof (by extrusion, rolling, solidification of elements in the form of sheets, and the like).

This invention also features a process for the production of a catalyst such as those described above.

In a first embodiment, this process comprises mixing an alumina suspension with a spinel type compound, acidifying the mixture to a pH of from about 0.2 to 4.5, preferably less than 4, then coating the substrate with this solution, drying and calcining the coated substrate, and, finally, depositing onto such support a precursor of cerium, prior to drying and calcining, followed by impregnation with solutions of the precursors of the elements constituting the active phase.

In a second embodiment of the process, the substrate is coated with a suspension of alumina and then calcined. A solution containing a precursor of the divalent metal of the spinel is impregnated onto the alumina layer, which is then calcined to form the spinel.

The calcination temperature is less than 1,000 C. The cerium precursor is then deposited as in the first embodiment.

In a third process embodiment, the cerium precursor is added directly into the suspension of the alumina and the spinel type compound prior to coating the substrate.

As the cerium precursor, cerium salts which decompose under the effect of heat into an oxide of cerium may be used, such as the nitrates, carbonates, acetates, oxalates, and oxyhydroxides of cerium.

In a preferred embodiment of the invention, the cerium precursor is a colloidal cerium oxyhydrate.

The third process embodiment makes it possible to eliminate the stage of impregnation or deposition of cerium onto the alumina coating, which considerably simplifies the process relative to practicality and economy.

Furthermore, the use of a colloidal cerium oxyhydroxide solution makes it possible to improve the structural characteristics of the porous layer and its capacity to store oxygen.

In order to further illustrate the present invention and the advantages thereof, the following specific examples are given, it being understood that same are intended only as illustrative and in nowise limitative.

EXAMPLE 1

Preparation of a Catalyst (A) According to the Prior Art

A binder and an alumina filler were prepared according to the process described in EP No. 73,703.

An alumina binder was prepared as follows: 5,000 g alumina obtained by dehydration in a flowstream of hot gas at 800° for 0.5 sec, were introduced into an autoclave containing a nitric acid solution at pH 1. The suspension was heated for 4 h at 180° C. The resulting suspension, which constituted the alumina binder, was dried by atomization at 105° C. The powder obtained, by X-ray examination, showed a fibrillar boehmite structure.

A fraction of this powder was calcined in air at 600° for 2 h to produce the alumina filler. 200 g of the binder were dispersed in the powder form in 2,000 cm³ distilled water. 800 g of the alumina filler were added to the dispersion. The viscosity of the resulting suspension was 25 mPa.s. This suspension (1) was used to coat a 1.98 liter monolithic ceramic structure marketed by Corning and having 62 cells per cm². The 1.98 liter monolith was submerged into the suspension at pH 3.4 and containing 30% by weight alumina. The monolith was drained such that the channels were emptied, then dried and calcined at 600° for 3 h.

The coated monolith was then immersed in an aqueous solution of cerium nitrate, then drained, dried at 150° C. and calcined at 700° C. for 3 h. The cerium nitrate concentration of the solution was such that, after immersion and calcination, the monolith contained 6% by weight of cerium oxide relative to the porous coating of the monolith. The substrate was then impregnated by soaking it in an aqueous solution of hexachloroplatinic acid. The concentration of said acid was such that the monolith became impregnated with 2 g platinum. After 30 min of contact, the monolith was dried at 150° C., then activated at 500° C. for 3 h in a calcining furnace.

The catalyst (A) prepared in this manner contained, by weight relative to the monolithic catalyst, 0.2% platinum and 1.2% cerium oxide.

EXAMPLE 2

Preparation of a Catalyst (B) according to the prior art 200 g of an alumina binder (2) marketed by RhonePoulenc Chimie under the trademark EGB 200 were dispersed in 2,000 cm³ distilled water. To this dispersion were added 800 g of a calcined alumina filler (2) marketed by the Condea Co. under the trademark PURLOX ®.

281 g of cerous nitrate were introduced into the alumina suspension. The viscosity of the resulting suspension was 65 mPa.s. This suspension was used to coat a 0.933 liter ceramic monolithic structure, marketed by Corning and having 62 cells per cm². The monolith was submerged in the suspension at pH 3.1.

The coated monolith was drained to empty the channels, then dried and calcined at 600° C. for 3 h. The monolith coated in this manner contained 2.8% by weight of cerium oxide relative to the porous layer of the coating. The substrate was then impregnated by soaking it in 160 ml of an aqueous solution of hexachloroplatinic acid, palladium chloride and hydrated rhodium trichloride, containing 0.5 g platinum, 0.5 g palladium and 0.05 g rhodium.

The substrate was then activated as in Example 1.

The catalyst (B) prepared in this manner contained, by weight relative to the monolithic catalyst, 0.1% platinum, 0.1% palladium, 0.01% rhodium and 0.46% cerium oxide.

Preparation of a catalyst (C) according to the prior art:

A nickel and alumina spinel was prepared according to the teachings of U.S. Pat. No. 4,274,981. 300 g of Prolabo nickel oxide were mixed with 410 g Condea alumina, marketed under the trademark Dispural ® and having a specific surface of 170 m²/g. The respective grain size distributions of the two oxides were 13.5 micrometer and 17 micrometer. The mixture of the two powders was heated over 20 h in a furnace at a temperature of 1,400° C. After heat treatment, the mixture of the two powders, initially gray, became intense blue in color. X-ray diffraction analysis evidenced that a nickel aluminate had been synthesized, which also contained nickel oxide, NiO. This aluminate was then washed with 1 liter of 0.1N nitric acid solution, then with 2 liters of demineralized water. The cake washed in this manner was dried at 300 C for 12 h and ground in order to provide a mean particle size of 17 micrometers.

The textural characteristics of the aluminate made it a relatively dense product (total pore volume of 0.21 cm³/g and a very low specific surface of less than 1 m²/g).

A coating solution for the monolith was prepared as in Example 1 of U.S. Pat. No. 4,274,981. A Condea DISPURAL ® 10/3 alumina having a specific surface of 295 m²/g, was dispersed in demineralized water such as to produce a sol with 10% by weight alumina. This sol was stabilized by the addition of 2% acetic acid. A suspension was then prepared by adding, to 250 m³ demineralized water, 300 g of the stabilized sol, 45 g Al(NO₃)₃.9H₂O and, finally, 500 g nickel aluminate prepared according to the above-cited patent. The resulting suspension had a viscosity of 1,055 mPa.s after one hour of agitation.

The dry extract of this suspension contained 7% alumina and 93% nickel aluminate. A cordierite monolith marketed by Corning having a volume of 0.933 liter and containing 62 cells per cm² of crosssection, was coated with the suspension prepared according to the process described in said U.S. Pat. No. 4,274,981. In view of the high viscosity of the suspension, coating was difficult and resulted in a monolith having 13% clogged channels.

The weight of the coating deposited onto the monolith was 40 g.

A measurement of the textural characteristics of the coating determined a specific surface of 15 m²/g, which was very low and did not permit good distribution of precious metals onto such a support.

The monolith coated with a spinel of nickel and aluminum was then immersed in an aqueous solution of cerous nitrate.

It was then drained, dried at 150° C. and calcined at 700° C. for 3 h. The cerium nitrate concentration in the solution was such that, after impregnation and calcining, the monolith contained 10% by weight cerium oxide relative to the porous layer of the coating. The substrate was then impregnated by soaking it in an aqueous solution of hexachloroplatinic acid and hydrated rhodium trichloride. The hexachloroplatinic acid and rhodium trichloride concentrations were such that the monolith was impregnated with 1 g platinum and 0.05 g rhodium. After 30 min of contact, the monolith was dried at 150° C. and activated at 500° C. for 3 h in a calcining furnace.

The catalyst (C) prepared in this manner contained, by weight relative to the monolithic catalyst, 0.2% platinum, 0.01% rhodium, 2% cerium oxide and 6.10% nickel.

EXAMPLE 4

Preparation of a catalyst (D) according to the invention:

A nickel nitrate solution was prepared by dissolving 2.837 g Ni(NO₃). 6 H₂O in demineralized water. This solution was used to impregnate 5,000 g dry alumina in pellets, marketed by Rhone-Poulenc under the trademark SCM 129X and having a specific surface of 184

$m^2/g$. The impregnated product was dried at 110° C., calcined at 900° C. for 6 h, then ground. Quantitative X-ray diffraction analysis showed that the product obtained contained only nickel aluminate and that the mean size of the crystallites was about 5.2 nanometers. The specific surface of this aluminate was 92 $m^2/g$ and its pore volume was 0.72 cm3/g.

A coating suspension was prepared by mixing, in an aqueous solution of 25 parts of a peptizable alumina, marketed by Rhone-Poulenc Chimie under the trademark EGB No 200, 75 parts of the aforementioned preferred nickel aluminate. Nitric acid was added to the suspension to obtain a ratio of $HNO_3/Al_2O_3+$aluminate of 0.9%. The resulting suspension had a density of 1.360 g/l and was ground in a microball grinder. After grinding, the viscosity of the suspension was 16.1 mPa.s.

A monolithic support, marketed by Corning and identical to the support used in Example 2, was coated with said solution by the technique described in FR No. 2,512,004. After drying and calcination, a substrate coated with a layer of 96.5 g was produced.

This coating itself contained 75% nickel aluminate. A measurement of the textural characteristics of the coating provided the following values: specific surface 130 $m^2/g$, L total pore volume 0.66 $cm^3/g$.

A colloidal suspension of cerium oxyhydroxide was prepared, for example by the process described in FR No. 2,416,867, by decomposing 100 g cerium hydroxide containing 77.9% cerium oxide (Rhone-Poulenc Chimie) with 120 ml of a 0.75N aqueous solution of nitric acid.

The mixture was then heated to 70° C. for 10 min under agitation. The cerium hydroxide precipitate formed by this reaction was separated from the supernatant solution and then dispersed in 200 ml distilled water to form a colloidal suspension. The characteristics of the cerium hydroxide solution obtained in this manner were as follows: $CeO_2$ concentration=325 g/l, mean size of the cerium hydroxide colloids=16 nm, pH of the solution=1.1.

The coated substrate was immersed in the colloidal suspension of cerium. The cerium concentration in the colloidal suspension was adjusted such that, after the immersion and calcination, the monolith contained 10 g cerium oxide.

The monolith was then drained, dried at 150° and calcined at 700° C. for 2 h.

The monolith was then impregnated by soaking it in 160 ml of an aqueous solution of hexachloroplatinic acid and hydrated rhodium trichloride, containing 1 g platinum and 0.05 g rhodium.

The catalyst was activated as in Example 1.

The catalyst (D) prepared in this manner contained, by weight relative to the monolithic catalyst, 0.2% platinum, 0.01% rhodium, 2% cerium oxide and 4.8% nickel.

EXAMPLE 5

Preparation of a catalyst (E) according to the invention:

A 0.933 liter monolithic ceramic substrate was coated with an alumina by the process described in Example 1.

The coated monolith was then immersed in an aqueous solution of nickel nitrate, then drained, dried at 110° C. and calcined at 900° C. for 6 h. The concentration of nickel nitrate in the solution was such that, after immersion and calcination, the monolith contained 75% by weight nickel aluminate relative to the porous layer of the coating.

The substrate was then impregnated by soaking it in 160 ml of a colloidal suspension of cerium prepared by the process described in Example 4, the concentration of which was adjusted such that, after impregnation and calcination at 400° C., the monolith contained 5% by weight cerium oxide relative to the porous layer.

The substrate was then impregnated by immersion in 160 ml of an aqueous solution of hexachloroplatinic acid, palladium chloride and hydrated rhodium trichloride containing 0.5 g platinum, 0.5 g palladium and 0.05 g rhodium.

The catalyst was activated as in Example 1.

The catalyst (E) prepared in this manner contained, by weight relative to the monolithic catalyst, 0.1% platinum, 0.1% palladium, 0.01% rhodium, 1% cerium oxide and 4.8% nickel.

EXAMPLE 6

Preparation of a catalyst (F) according to the invention:

A suspension (6) was prepared by mixing, in an aqueous solution, 911 g nickel aluminate prepared as in Example 4, 427 g alumina marketed by Rhone-Poulenc Chimie under the trademark EGB 200 and 1,628 $cm^3$ of an aqueous colloidal cerium solution prepared according to the process of Example 4.

Nitric acid was added to provide a viscosity of the solution of 25.2 mPa.s. A 0.933 liter ceramic monolith marketed by Corning and having 62 cells per $cm^2$, was coated by the solution thus prepared. The aforesaid support was drained to empty the channels, dried and then calcined at 600° for 1.5 h. The deposit obtained was 125 g/l. The concentration of the suspension in cerium was such that, after immersion and calcination, the monolith contained 10% cerium (expressed as $CeO_2$) in the porous layer of the coating. This monolithic support had a specific surface of 34 $m^2/g$ and a total pore volume of 0.31 $cm^3/g$. The coating, having a specific surface of 118 $m^2/g$ and a total pore volume of 0.63 $cm^3/g$, contained 50% nickel aluminate.

The substrate (E) was then impregnated with 160 ml of a solution of hexachloroplatinic acid and of palladium chloride containing 0.5 g platinum and 0.5 g palladium. This catalyst was then activated as in Example 1.

The catalyst (F) prepared in this manner contained, by weight relative to the monolithic catalyst, 0.1% platinum, 0.1% palladium, 2% cerium oxide and 3.3% nickel.

EXAMPLE 7

Activity of the different catalysts measured using a synthetic mixture:

The present example reports the results obtained in the purification of CO, $C_3H_6$ and $NO_x$ from a synthetic mixture with the catalysts (A), (B), (C), (D), (E) and (F) respectively described in Examples 1 to 6.

The performance of the catalysts described in Examples 1 to 6 and the sulfur contents deposited were determined after aging for 2 h at 750° C. in a flow of gas of 300 l/h of a synthetic mixture containing 1% $SO_2$, 4% oxygen and 95% nitrogen.

The weight contents of sulfur deposited on each of the catalysts were determined by X-fluorescence on specimens of the catalysts (A), (B), (C), (D), (E) and (F), aged and produced by grinding the specimens to 50 microns.

The performance of the catalysts described in Examples 1 to 6 was determined by the procedure described below:

Measurement of performance in a thermal cycle of 200° to 500° C.

The catalyst specimens were first heated on a measuring test bench to 200° C. and exposed to a gas flow at a constant rate and having the following composition:

| | |
|---|---|
| CO | 1.5% |
| $O_2$ | 0.75% |
| $H_2O$ | 13% |
| $C_3H_6$ | 0.04% |
| $NO_x$ | 0.2% |
| $CO_2$ | 13% |
| Nitrogen | to 100% |

The flow rate of the gas is defined such as to establish a volume velocity per hour of 100,000 l/h in the catalyst.

The principle of the multifunctional test was the following:

(i) the catalyst was heated to a given temperature $T_1$, for example 200° C., and the $C_3H_6$ content was determined by gas phase chromatography, the CO content by a specific analyzer of the trademark COSMA, and the $NO_x$ content by a specific analyzer of the trademark TERHMOELECTRON, in the gas exiting the reactor.

The conversion percentages obtained on the catalyst examined at the $T_1$ inlet temperature were derived by the following equations:

$$CO\ (\%\ conversion)\ T1 = \frac{\%\ CO\ initial - (\%\ CO\ measured)\ T_1}{\%\ CO\ initial} \times 100$$

$$C_3H_6\ (\%\ conversion)\ T1 = \frac{\%\ C_3H_6\ initial - (\%\ C_3H_6\ measured)\ T_1}{\%\ C_3H_6\ initial} \times 100$$

$$NO_x\ (\%\ conversion)\ T1 = \frac{\%\ NO_x\ initial - (\%\ NO_x\ measured)\ T_1}{\%\ NO_x\ initial} \times 100$$

The catalyst was then heated from 200° to 500° over 1 h with linear temperature programming and the converion percentages of CO, $C_3H_6$ and $NO_x$ were determined continuously.

(ii) The efficiency of the catalyst relative to the oxidation of CO, $C_3H_6$ and the reduction of nitrogen oxides were calculated by the relationships of the type:

$$E_{CO}\ \% = 100 \int_{T=200°\ C.}^{T=500°\ C.} \%\ \text{conversion of CO}$$

$$E\ C_3H_6\ \% = 100 \int_{T=200°\ C.}^{T=500°\ C.} \%\ \text{conversion of } C_3H_6$$

$$E\ NO_x\ \% = 100 \int_{T=200°\ C.}^{T=500°\ C.} \%\ \text{conversion of NO}$$

The Table reports the results obtained using the different catalysts (A), (B), (C), (D), (E) and (F) respectively described in Examples 1 to 6.

TABLE

| | Example No. | Catalyst | S Content weight % | Catalyst efficiency in 200° to 500° thermal cycles (%) | | |
|---|---|---|---|---|---|---|
| | | | | CO | $C_3H_6$ | $NO_x$ |
| Prior art | 1 | A | 8.3 | 77.3 | 71.7 | 20.5 |
| | 2 | B | 7 | 75.4 | 70.5 | 35.1 |
| | 3 | C | 5.1 | 60.5 | 55.2 | 37.5 |
| Invention | 4 | D | 2.4 | 83.3 | 87.6 | 55.5 |
| | 5 | E | 2.5 | 80.4 | 77.5 | 50.5 |
| | 6 | F | 2.6 | 87.5 | 89.7 | 30.5 |

It will be seen that the catalysts (D), (E) and (F) prepared according to the invention were quite improved relative to the catalysts (A), (B) and (C) prepared according to the prior art, both with respect to their resistance to poisoning by sulfur and as to stability of activity.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A catalyst support which comprises an inert, rigid substrate coated with a layer of porous material, said porous material comprising alumina, at least one rare earth oxide, and a spinel compound having a specific surface of at least 50 m²/g.

2. The catalyst support as defined by claim 1, said spinel compound having a specific surface ranging from 50 m²/g to 300 m²/g.

3. The catalyst support as defined by claim 1, said porous material comprising 15% to 40% by dry weight of said alumina, 1% to 25% by dry weight of said at least one rare earth oxide, and 35% to 84% by dry weight of said spinel compound.

4. The catalyst support as defined by claim 3, said porous material comprising 40% to 75% by dry weight of said spinel compound.

5. The catalyst support as defined by claim 3, said porous material comprising 20% to 40% by dry weight of activated alumina.

6. The catalyst support as defined by claim 3, said porous material comprising 5% to 20% by dry weight of said at least one rare earth oxide.

7. The catalyst support as defined by claim 1, said spinel type compound having the formula $M^1M^2O_4$ wherein is magnesium, zinc, cobalt or nickel, and $M^2$ is aluminum.

8. The catalyst support as defined by claim 7, wherein $M^1$ is nickel or cobalt.

9. The catalyst support as defined by claim 1, said at least one rare earth oxide comprising cerium oxide.

10. The catalyst support as defined by claim 1, said inert, rigid substrate comprising a refractory material.

11. The catalyst support as defined by claim 10, said refractory material comprising a metal or a ceramic shaped article.

12. The catalyst support as defined by claim 1, said inert, rigid substrate comprising a cellular monolith.

13. The catalyst support as defined by claim 12, said cellular monolith comprising a honeycomb.

14. A thermally stable, sulfur-resistant catalyst, comprising the catalyst support as defined by claim 1, said support having a catalytically effective amount of a catalytically active phase impregnated onto the porous coating thereof.

15. The catalyst as defined by claim 14, said catalytically active phase comprising at least one precious metal.

16. The catalyst as defined by claim 15, said at least one precious metal comprising platinum, palladium, rhodium or iridium.

17. The catalyst as defined by claim 15, said catalytically active phase comprising at least one other catalytically active element.

18. The catalyst as defined by claim 17, said at least one other catalytically active element comprising iron, zirconium, vanadium, chromium, germanium, cobalt, uranium, rhenium, or a rare earth.

19. The catalyst as defined by claim 14, comprising an oxidation catalyst.

20. The catalyst as defined by claim 14, comprising a multifunctional catalyst.

21. A process for the preparation of the catalyst as defined by claim 14, comprising (i) mixing a suspension of alumina with a spinel type compound, (ii) adjusting the pH of the mixture to a value less than 4, (iii) coating the inert, rigid support substrate with said pH-adjusted mixture, (iv) drying and calcining said coated substrate, (v) depositing at least one precursor of the at least one rare earth oxide onto said calcined substrate, (vi) drying and calcining the resulting shaped support, and (vii) impregnating a catalytically active phase onto the resulting catalyst support.

22. A process for the preparation of the catalyst as defined by claim 14, comprising (i) coating the inert, rigid substrate with a suspension of alumina, (ii) drying and calcining said coated substrate, (iii) impregnating said dried and calcined substrate with a solution of at least one precursor of magnesium, zinc, cobalt or nickel, (iv) calcining said impregnated substrate at a temperature of less than 1,000° C., (v) depositing a precursor of at least one rare earth onto the substrate thus coated, (vi) drying and calcining the resulting shaped support, and (vii) impregnating a catalytically active phase onto the resulting catalyst support.

23. A process for the preparation of the catalyst as defined by claim 14, comprising (i) mixing a suspension of alumina with a spinel compound and at least one precursor of at least one rare earth oxide, (ii) adjusting the pH of the mixture to a value less than 4, (iii) coating the inert, rigid support substrate with said pH-adjusted mixture, (iv) drying and calcining said coated substrate, and (v) impregnating a catalytically active phase onto the resulting catalyst support.

24. The process of claim 21, wherein the pH of step (ii) is adjusted to a value of at least 0.2.

25. The process of claim 23, wherein the pH of step (ii) is adjusted to a value of at least 0.2.

* * * * *